United States Patent [19]

Breuers

[11] 4,164,967
[45] Aug. 21, 1979

[54] SCREWDRIVER

[76] Inventor: Konrad K. Breuers, P.O. Box 94441, Richmond, British Columbia, Canada

[21] Appl. No.: 890,344

[22] Filed: Mar. 27, 1978

[51] Int. Cl.² ............................................. B25B 15/00
[52] U.S. Cl. ................................................ 145/50 A
[58] Field of Search ...................................... 145/50 A

[56] References Cited
U.S. PATENT DOCUMENTS

| | | | |
|---|---|---|---|
| 1,285,752 | 11/1918 | Loiselle et al. | 81/90 C |
| 3,259,000 | 7/1966 | Lasch | 81/90 C |

Primary Examiner—Robert L. Spruill
Assistant Examiner—J. T. Zatarga
Attorney, Agent, or Firm—Townsend and Townsend

[57] ABSTRACT

A screwdriver for screws having two spaced head recesses. The screwdriver comprises tang with two ends; a handle attached to a first end of the tang; two spaced driving prongs attached at a second end of the tang for fitting into the recesses of a screw; and resilient means for varying the spacing between the prongs so the screwdriver can be used on screws having different spacing between the recesses.

2 Claims, 1 Drawing Figure

SCREWDRIVER

BACKGROUND OF THE INVENTION

1. Field of the Invention

This invention relates to an adjustable screwdriver for screwing screws with two spaced head recesses.

2. Discussion of the Prior Art

Tamper-proof screws, sometimes referred to as "saftey screws", are used in locations were it is desired to discourage removal of the screws, since a special screwdriver is required. Such screws have a head with two spaced recesses. Since the centre-to-center spacing of the recesses varies according to the size of the screw, a workman must carry several special screwdrivers when using screws of various sizes. The special screwdrivers have two fixed prongs spaced apart to fit a particular screw.

SUMMARY OF THE INVENTION

According to this invention, there is provided a screwdriver for screws having two spaced head recesses. The screwdriver comprises a tang with two ends; a handle attached to a first end of the tang; two spaced driving prongs attached at a second end of the tang for fitting into the recesses of one of the screws; and resilient means for varying the spacing between the prongs so that the screwdriver can be used on screws having different spacing between the recesses.

For example, a first prong is attached to the second end of the tang and a second prong is attached to the resilient means.

The screwdriver may include a slot at the second end of the screwdriver, the second prong being movable within the slot to vary the spacing between the prongs. The slot has two sides to support the second prong when the screwdriver screws a screw.

Preferably, the resilient means comprises a curved metal spring with two ends, a first end of the spring attached to the tang generally half way between the ends of the tang, the second end being between sides of the slot and attached to the second prong.

DESCRIPTION OF THE PREFERRED EMBODIMENT

Figure 1:
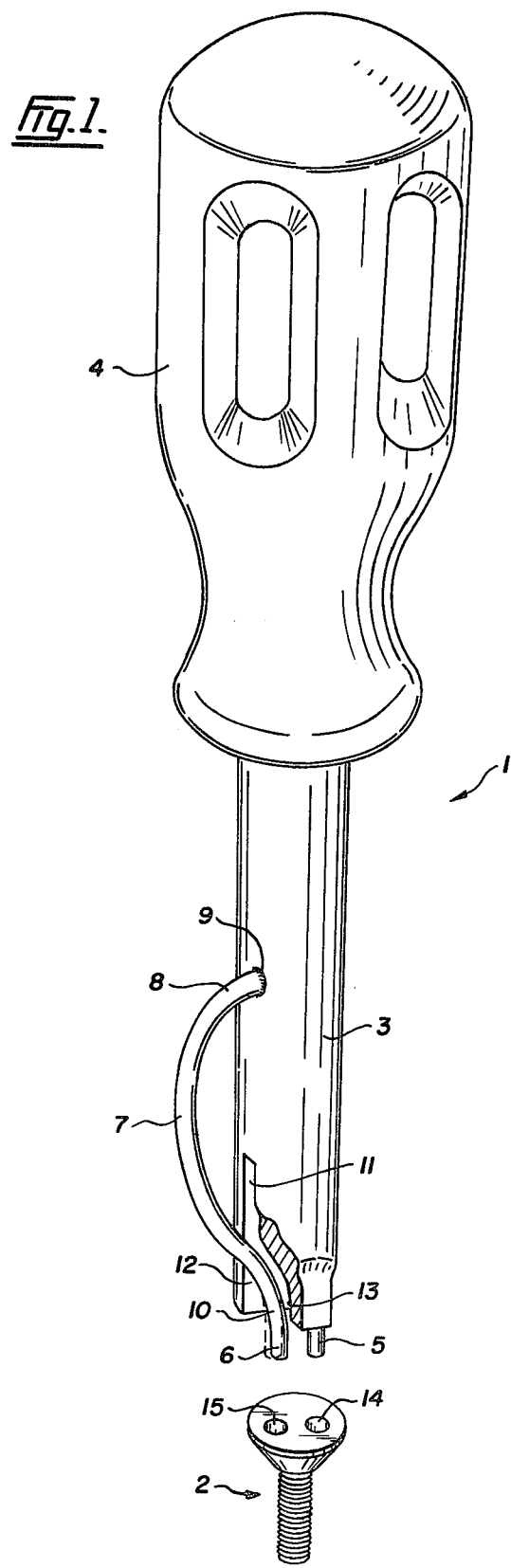
FIG. 1 is a partly sectional perspective view of a screwdriver according to an embodiment of the invention and a tamper-proof screw.

FIG. 1 shows a screwdriver 1, according to an embodiment of the invention, suitable for screwing tamper-proof screws such as screw 2. Screwdriver 1 has a tang 3 with a handle 4 attached to one end of the tang and two spaced driving prongs 5 and 6 attached at the other end of the tang 3. Prong 5 is attached to the tang 3 and prong 6 is integral with curved metal spring 7. Spring 7 has a first end 8 held in a bore 9 in tang 3 by spot welding. The bore 9 is located on the tang 3 about midway between the prongs 5 and 6 and handle 4. The spring 7 has a second end 10 which in this embodiment is integral with prong 6. End 10 of spring 7 is located within slot 11 on tang 3. As may be seen, end 10 of spring 7 and prong 6 are movable within slot 11 so the spacing between prongs 5 and 6 can be varied as shown by the dotted lines. At the same time, end 10 of spring 7 and prong 6 are guided by side 12 and side 13 of slot 11. Because prong 6 is attached to spring 7, the screwdriver 1 is suitable for screwing screws, such as screw 2, having different spacing between the recesses 14 and 15. When the screwdriver 1 is used for screwing or unscrewing screws, the sides 12 and 13 of slot 11 provides support for prong 6 and spring 7. When it is desired to use screwdriver 1 for screws having spacing between the recesses different than the spacing between prongs 5 and 6 when spring 7 is unstressed, prong 5 is first placed in one recess, then prong 6 is adjusted to fit the other recess by pressing or pulling spring 7.

What I claim is:

1. A screwdriver for screws having two spaced head recesses, the screwdriver comprising:

a tang with two ends, a handle attached to a first end of the tang, two spaced driving prongs attached at a second end of the tang for fitting into the recesses of one said screw, resilient means for varying the spacing between the prongs so the screwdriver can be used on screws having different spacings between the recesses, a first said prong being attached to the second end of the tang and a second said prong attached to said resilient means, a slot at the second end of the tang, the slot having two sides, the second prong being movable within the slot to vary the spacing between the prongs and being supported by the two sides of the slot when the screwdriver is used for screwing a screw, said resilient means comprising a curved metal spring with two ends, a first end of the spring attached to the tang generally halfway between the ends of the tang, and a second end of the spring being between the sides of the slot and attached to the second prong.

2. A screwdriver as claimed in claim 1, the second prong being integral with the metal spring.

* * * * *